United States Patent
Chrzanowski et al.

(10) Patent No.: US 11,836,596 B2
(45) Date of Patent: *Dec. 5, 2023

(54) NEURAL NETWORKS WITH RELATIONAL MEMORY

(71) Applicant: DeepMind Technologies Limited, London (GB)

(72) Inventors: Mike Chrzanowski, San Francisco, CA (US); Jack William Rae, London (GB); Ryan Faulkner, London (GB); Theophane Guillaume Weber, London (GB); David Nunes Raposo, London (GB); Adam Anthony Santoro, London (GB)

(73) Assignee: DeepMind Technologies Limited, London (GB)

( * ) Notice: Subject to any disclaimer, the term of this patent is extended or adjusted under 35 U.S.C. 154(b) by 367 days.

This patent is subject to a terminal disclaimer.

(21) Appl. No.: 17/107,621

(22) Filed: Nov. 30, 2020

(65) Prior Publication Data
US 2021/0081795 A1    Mar. 18, 2021

Related U.S. Application Data

(63) Continuation of application No. 16/415,954, filed on May 17, 2019, now Pat. No. 10,853,725.

(Continued)

(51) Int. Cl.
*G06N 3/08* (2023.01)
*G06N 3/042* (2023.01)
(Continued)

(52) U.S. Cl.
CPC ....... *G06N 3/042* (2023.01); *G06F 18/24137* (2023.01); *G06N 3/04* (2013.01); *G06N 3/08* (2013.01); *G06N 20/00* (2019.01)

(58) Field of Classification Search
CPC .................................. G06N 3/08; G06N 3/04
See application file for complete search history.

(56) References Cited

U.S. PATENT DOCUMENTS

2009/0031089 A1   1/2009  Tuominen
2016/0358071 A1  12/2016  Grefenstette
(Continued)

FOREIGN PATENT DOCUMENTS

| EP | 3101598 | 12/2016 |
|---|---|---|
| WO | WO 2017/100711 | 6/2017 |
| WO | WO 2017/136080 | 8/2017 |

OTHER PUBLICATIONS

Chandar et al., "Hierarchical Memory Networks", 2016 (Year: 2016).*

(Continued)

*Primary Examiner* — Selene A. Haedi
(74) *Attorney, Agent, or Firm* — Fish & Richardson P.C.

(57) ABSTRACT

A system including one or more computers and one or more storage devices storing instructions that when executed by the one or more computers cause the one or more computers to implement a memory and memory-based neural network is described. The memory is configured to store a respective memory vector at each of a plurality of memory locations in the memory. The memory-based neural network is configured to: at each of a plurality of time steps: receive an input; determine an update to the memory, wherein determining the update comprising applying an attention mechanism over the memory vectors in the memory and the received input; update the memory using the determined update to the memory; and generate an output for the current time step using the updated memory.

20 Claims, 4 Drawing Sheets

Related U.S. Application Data (60) Provisional application No. 62/673,818, filed on May 18, 2018.

(51) Int. Cl.
    *G06N 3/04*       (2023.01)
    *G06N 20/00*     (2019.01)
    *G06F 18/2413*   (2023.01)

(56) References Cited

U.S. PATENT DOCUMENTS

| | | |
|---|---|---|
| 2017/0024645 A1 | 1/2017 | Socher |
| 2017/0200076 A1 | 7/2017 | Vinyals |
| 2018/0060665 A1 | 3/2018 | Song |
| 2018/0357240 A1* | 12/2018 | Miller .............. G06F 16/24578 |
| 2019/0318249 A1* | 10/2019 | Xu ..................... G06F 16/3329 |
| 2019/0354858 A1 | 11/2019 | Chrzanowski |

OTHER PUBLICATIONS

Song et al., "Attend and Diagnose: Clinical Time Series Analysis Using Attention Models", Apr. 2018 (Year: 2018).*
Brown et al., "Recurrent Neural Network Attention Mechanisms for Interpretable System Log Anomaly Detection", Mar. 2018 (Year: 2018).*
Kumar et al., "Ask Me Anything: Dynamic Memory Networks for Natural Language Processing", 2016 (Year: 2016).*
Gilmer et al, "Neural message passing for quantum chemistry," CoRR, Jun. 12, 2017, arxiv.org/abs/1704.01212, 14 pages.
Grave et al, "Improving neural language models with a continuous cache," CoRR, Dec. 13, 2016, arxiv.org/abs/1612.04426, 9 pages.
Graves et al, "Generating sequences with recurrent neural networks," CoRR, Jun. 5, 2014, arxiv.org/abs/1308.0850, 43 pages.
Graves et al, "Neural Turing Machines," CoRR, Dec. 10, 2014, arxiv.org/abs/1410.5401, 26 pages.
Henaff et al, "Tracking the world state with recurrent entity networks," CoRR, May 10, 2017, arxiv.org/abs/1612.03969, 15 pages.
Hiemstra, "Using language models for information retrieval," Grafisch Centrum Twente, Jan. 2001, 178 pages.
Hochreiter et al, "Long short term memory," ACM Digital Library, Nov. 1997, 32 pages.
Hu et al. "Relation networks for object detection," Proceedings of the IEEE Conference on Computer Vision and Pattern Recognition, Jun. 14, 2018, 11 pages.
Jozefowicz et al, "Exploring the limits of language modeling," CoRR, Feb. 11, 2016, arxiv.org/abs/1602.02410, 11 pages.
Kingma et al, "A method for stochastic optimization," arXiv preprint arXiv:1412.698, Jan. 30, 2017, 15 pages.
Kipf et al, "Semi-supervised classification with graph convolutional networks," CoRR,, Feb. 22, 2017, arxiv.org/abs/1609.02907, 14 pages.
Knowlton et al, "A neurocomputational system for relational reasoning," Eksevuer Ltd Cell Press, 2012, 9 pages.
Li et al, "Gated graph sequence neural networks," CoRR, Sep. 22, 2017, arxiv.org/abs/1511.05493, 20 pages.
Liu et al, "Non-local recurrent network for image restoration," Advances in Neural Information Processing Systems 31, Dec. 11, 2018, 13 pages.
Marcus et al, "Building a large annotated corpus of English: The penn treebank," Penn Libraries, Oct. 1993, 25 pages.
Merity et al, "Pointer sentinel mixture models," CoRR, Sep. 26, 2016, arxiv.org/abs/1609.07843, 13 pages.
Merity et al, "Scalable language modeling: Wikitext-103 on a single gpu in 12 hours," SYSML, Feb. 2018, 2 pages.
Palm et al, "Recurrent Relational Networks," Advances in Neural Information Processing Systems 31, Nov. 21, 2017, 17 pages.
Parker et al, "English gigaword fifth edition ldc2011t07," Linguistic Data Consortium, University of Pennsylvania, available on or before 1992, retrieved on Jul. 6, 2019, retrieved from: URL<https://catalog.ldc.upenn.edu/LDC2011T07>, 2 pages.

Pascanu et al, "How to construct deep recurrent neural networks," CoRR, Apr. 24, 2014, arxiv.org/abs/1312.6026, 13 pages.
Pavez et al, "Working memory networks: Augmenting memory networks with a relational reasoning module," CoRR, May 23, 2018, arxiv.org/abs/1805.09354, 10 pages.
PCT International Preliminary Report on Patentability in International Appln. No. PCT/EP2019/062911, dated Nov. 24, 2020, 11 pages.
PCT International Search Report and Written Opinion in International Appln. No. PCT/EP2019/062911, dated Aug. 28, 2019, 19 pages.
Rae et al, "Fast parametric learning with activation memorization," CoRR, Mar. 27, 2018, arxiv.org/abs/1803.10049, 16 pages.
Rapose et al, "Discovering objects and their relations from entangled scene representations," CoRR, Feb. 16, 2017, arxiv.org/abs/1702.05068, 16 pages.
Santoro et al, "A simple neural network module for relational reasoning," Advances in Neural Information Processing Systems 30, Jun. 5, 2017, 16 pages.
Santoro et al, "Meta-learning with memory-augmented neural networks," International Conference on Machine Learning, 2016, 9 pages.
Santoro et al, "Relational recurrent neural networks," Advances in Neural Information Processing Systems 31, Jun. 5, 2018, 17 pages.
Scarselli et al, "The graph neural network model," IEEE Transaction on Neural networks, Jan. 2009, 22 pages.
Sukhbaatar et al, "End-to-end memory networks," Advances in Neural Information Processing Systems 28, Nov. 24, 2015, 11 pages.
Sutskever et al, "Sequence to sequence learning with neural networks," Advances in Neural Information Processing Systems 27, Dec. 14, 2014, 9 pages.
Tran et al, "Recurrent memory networks for language modeling," CoRR, Jan. 6, 2016, arxiv.org/abs/1601.01272, 10 pages.
Vaswani et al, "Attention is all you need," Advances in Neural Information Processing Systems 30, Dec. 6, 2017, 15 pages.
Velickovic et al, "Graph attention networks," CoRR, Feb. 4, 2018, arxiv.org/abs/1710.10903, 12 pages.
Vinyals et. al., "Order Matters: Sequence to Sequence for Sets," CoRR, Nov. 2015, arxiv.org/abs/1511.06391, 11 pages.
Waltz et al, "A system for relational reasoning in human prefrontal cortex," American Psychological Society, Mar. 1999, 7 pages.
Wang et al, "Non-local neural networks," Proceedings of the IEEE Conference on Computer Vision and Pattern Recognition, Apr. 13, 2018, 10 pages.
Weber et al, "Imagination-augmented agents for deep reinforcement learning," Advances in Neural Information Processing Systems 30, Feb. 14, 2018, 20 pages.
Yang et al, "Breaking the softmax bottleneck: a high-rank rnn language model," CoRR, Mar. 2, 2018, arxiv.org/abs/1711.03953, 18 pages.
Zambaldi et al, "Relational deep reinforcement learning," CoRR, Jun. 28, 2018, arxiv.org/abs/1806.01830, 15 pages.
Zaremba et al, "Learning to execute," CoRR, Feb. 19, 2015, arxiv.org/abs/1410.4615, 25 pages.
Bahdanau et al, "End-to-end attention-based large vocabulary speech recognition," 2016 IEEE International Conference on Acoustics, Speech and Signal Processing, Mar. 14, 2016, 8 pages.
Bahdanau et al, "Neural machine translation by jointly learning to align and translate," CoRR, May 19, arxiv.org/abs/1409.04732016, 15 pages.
Bai et al, "Convolutional sequence modeling revisited," ICLR 2018, 20 pages.
Battaglia et al, "Interaction networks for learning about objects, relations, and physics," Advances in Neural Information Processing Systems 29, Dec. 1, 2016, 12 pages.
Bengio et al, "Scheduled sampling for sequence prediction with recurrent neural networks," Advances in Neural Information Processing Systems 28, Sep. 23, 2015, 9 pages.
Chelba et al, "One billion word benchmark for measuring progress in statistical language modeling," CoRR, Mar. 4, 2014, arxiv.org/abs/1312.3005, 6 pages.

(56) References Cited

OTHER PUBLICATIONS

Cho et al, "Learning phrase representations using rnn encoder-decoder for statistical machine translation," CoRR, Sep. 3, 2014, arxiv.org/abs/1406.1078, 15 pages.
Dauphin et al, "Language modeling with gated convolutional networks," Proceedings of the 34th International Conference on Machine Learning, Sep. 8, 2017, 9 pages.
Espeholt et al, "IMPALA: Scalable distributed deep rl with importance weighted actor-learner architectures," CoRR, Jun. 28, 2018, arxiv.org/abs/1802.01561, 22 pages.
Gers et al, "Learning to forget: Continual prediction with lstm," Citeseerx, Jan. 1999, 19 pages.
Santoro et al, "Meta-learning with memory-augmented neural networks," International Conference on Machine Learning, 2016, 9 pages.
Office Action in European Appln. No. 19727313.9, dated Feb. 15, 2023, 11 pages.

* cited by examiner

NEURAL NETWORKS WITH RELATIONAL MEMORY

CROSS-REFERENCE TO RELATED APPLICATION

This application claims priority to U.S. application Ser. No. 16/415,954, filed May 17, 2019, which claims priority to U.S. Provisional Application Ser. No. 62/673,818, filed on May 18, 2018. The disclosure of the prior applications are considered part of and are incorporated by reference in the disclosure of this application.

BACKGROUND

This specification relates to neural network architectures that include a relational memory core.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network uses some or all of the internal state of the network after processing a previous input in the input sequence in generating an output from the current input in the input sequence.

SUMMARY

This specification describes a system implemented as computer programs on one or more computers in one or more locations. The system includes a memory-based neural network that includes a relational memory core.

In general, one innovative aspect of the subject matter described in this specification can be embodied in a system that includes one or more computers and one or more storage devices storing instructions that when executed by the one or more computers cause the one or more computers to implement a memory and a memory-based neural network. The memory is configured to store a respective memory vector at each of a plurality of memory locations in the memory. The memory-based neural network is configured to: at each of a plurality of time steps: receive an input; determine an update to the memory, wherein determining the update comprising applying an attention mechanism over the memory vectors in the memory and the received input; update the memory using the determined update to the memory; and generate an output for the current time step using the updated memory.

Thus implementations of the system explicitly allow memories, i.e. stored memory vectors, to interact with one another and the input to provide a relational memory core for use, e.g. for relational reasoning in a wide range of tasks. More specifically, in implementations the attention mechanism is applied over the plurality of memory locations at a single time step, that is, e.g. not across all previous representations computed from all previous inputs (e.g., observations).

The foregoing and other embodiments can each optionally include one or more of the following features, alone or in combination.

The input received at each of the plurality of time step may be one of (i) a network input of the memory-based neural network for the current time step or (ii) an intermediate input derived from a network input of the memory-based neural network for the current time step.

The memory-based neural network may maintain a plurality of parameter sets. The memory-based neural network may include a plurality of self-attention layers, each self-attention layer corresponding to a respective parameter set, a respective sub-memory of the memory, and a respective sub-memory of an appended memory that is created by appending the input to the memory. At each time step, each self-attention layer can be configured to determine a proposed update to the respective sub-memory by applying an attention mechanism over memory vectors in the respective sub-memory and the respective sub-appended memory using the respective parameter set. The memory-based neural network may be further configured to, at each time step, combine the proposed updates generated by the plurality of self-attention layers to generate the update for the memory. Combining the proposed updates may include column-wise concatenating the proposed updates to generate the update for the memory. The self-attention layers may operate in parallel.

Each of the plurality of parameter set may include a respective query weight matrix, a respective key weight matrix, and a respective value weight matrix. At each time step, each self-attention layer may be configured to determine a proposed update to the respective sub-memory by: applying a query linear projection of memory vectors in the respective sub-memory onto the respective query weight matrix to generate a respective query matrix, applying a key linear projection of memory vectors in the respective sub-appended memory onto the key weight matrix to generate a respective key matrix, applying a value linear projection of the memory vectors in the appended memory onto the value weight matrix to generate a respective value matrix, multiplying the respective query matrix and a transpose of the respective key matrix to determine a first temporary matrix, dividing each element of the first temporary matrix by a scaling factor to determine a second temporary matrix, applying a softmax operator on each element of the second temporary matrix to generate a softmax weight matrix, and multiplying the softmax weight matrix and the respective value matrix to determine the proposed update for the respective sub-memory. The scaling factor may be a square root of the dimension of key vectors in the respective key matrix.

The memory-based neural network may further include a feedforward neural network and one or more memory gating layers. At each time step, generating the output for the current time step using the updated memory may include: processing the updated memory using the feedforward neural network to generate an intermediate output; and gating the intermediate output using the one or more memory gating layers to generate the output for the current time step. The feedforward neural network may be a multilayer perceptron (MLP).

In some cases, the input is an input vector, and in these cases, appending the input to the memory may include performing a row-wise concatenation of the memory and the input vector. In some cases, the input is an input matrix.

Another innovative aspect of the subject matter described in this specification can be embodied in one or more computer storage media storing instructions that when executed by one or more computer cause the one or more computer to implement the above memory-based neural network.

Another innovative aspect of the subject matter described in this specification can be embodied in a method comprising the operations that the above memory-based neural network is configured to perform.

The subject matter described in this specification can be implemented in particular embodiments so as to realize one or more of the following advantages. By incorporating a new memory module, i.e., a relational memory core (RMC), into a memory-based neural network, the memory-based neural network described in this specification can have the ability to perform complex relational reasoning with information seen at different points in time.

In particular, while conventional memory-based neural networks can model temporal data by leveraging an ability to remember information for long periods, they may struggle at tasks that involve an understanding of the ways in which entities are connected, i.e., tasks that require relational reasoning (hereafter referred to as "relational reasoning tasks") due to the lack of ability to perform complex relational reasoning with the information they remember.

For example, a language modeling task that aims to predict a word given a sequence of observed words is one of the relational reasoning tasks that conventional neural networks would struggle on, as this task requires an understanding of how words that were observed in previous time steps are connected or related to each other. The memory-based neural network described herein can perform such language modeling tasks and therefore are useful for real-world applications such as predictive keyboard and search-phase completion, or can be used as components within larger systems (e.g., machine translation, speech recognition, and information retrieval systems).

As another example, the described memory-based neural network can obtain high performance on reinforcement learning tasks such as controlling an agent interacting with an environment that receives as input data characterizing the environment (observations) and in response to each observation generates an output that defines an action to be performed by the agent in order to complete a specified task. The specified task can be, for example, navigating an environment to collect pre-specified items while avoiding moving obstacles. Such tasks require relational reasoning capability, as the neural network must predict the dynamics of the moving obstacles in memory based on previous observations, and plan the agent's navigation accordingly and also based on remembered information about which items have already been picked up.

Other examples of tasks that require relational reasoning among temporal information in time-series data include multi-lingual machine translation, autonomous navigation (e.g., in self-driving cars), and health monitoring and treatment recommendations.

To address the deficiencies of existing memory-based neural networks, the memory-based neural network described in this specification uses an RMC module that employs multi-head dot product attention to allow memories to interact with each other. In contrast to previous memory architectures, the described memory-based neural network applies attention between memories at a single time step, and not across all previous representations computed from all previous inputs (e.g., observations). Thus, the described memory-based neural network can have a better understating of how memories are related, especially how a new input is related/correlated with previous inputs. Hence, the described memory-based neural network can better solve relational reasoning tasks than conventional neural networks. As a result, systems that implement the described memory-based neural network can have an increased capacity for handling relational reasoning tasks, resulting in improved accuracy when performing such tasks. Further, as the described memory-based neural network is configured to apply a self-attention mechanism over the plurality of memory vectors of the memory and the input at a single time step, information about entities involved in a relational reasoning task are implicitly parsed at each time step. Thus, the systems are more data efficient (compared to systems that employ conventional neural network memory architectures) because they may require less data and fewer learning steps to learn the relational reasoning task. The systems may also generalize better e.g. across multiple different but related tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
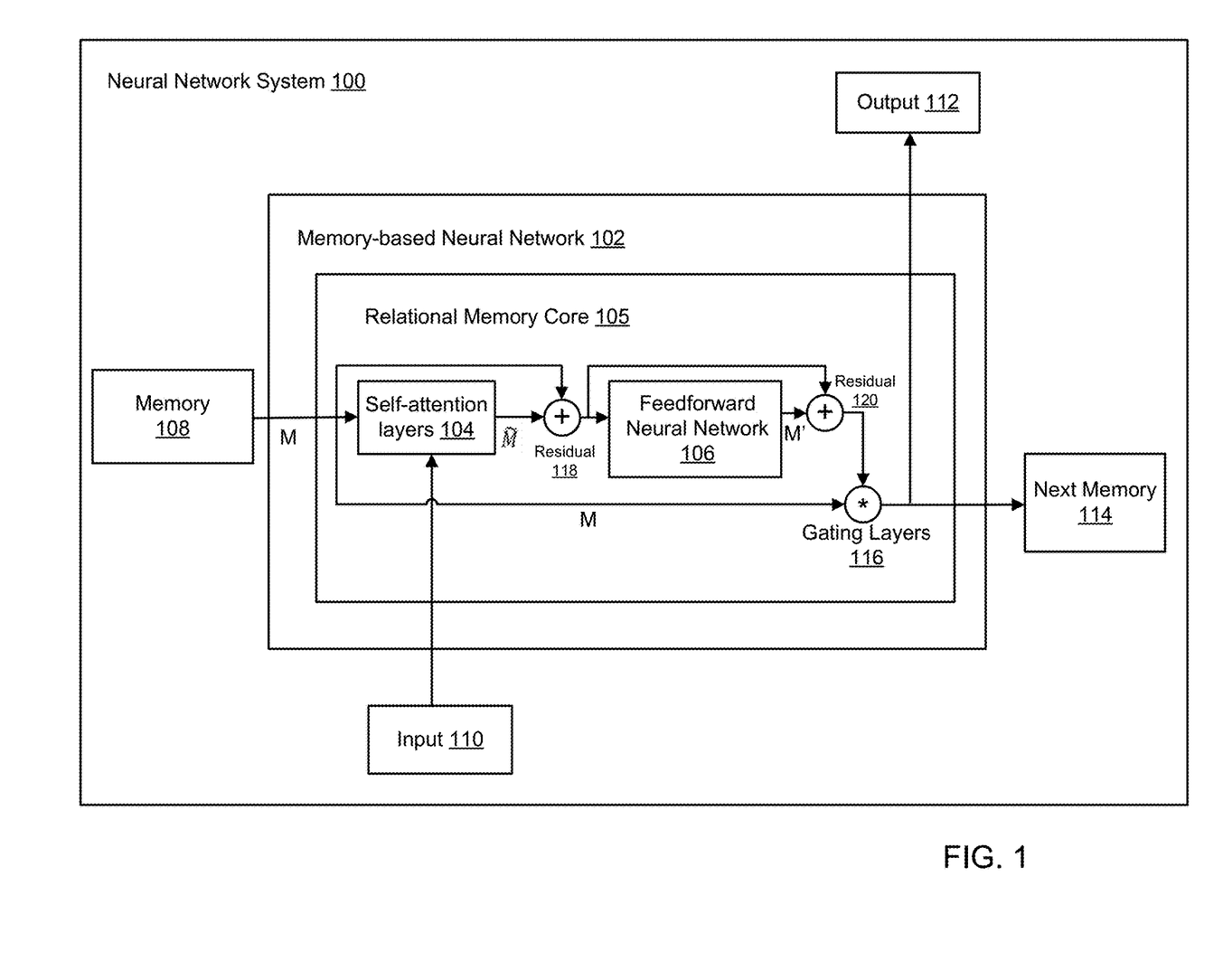
FIG. 1 illustrates an architecture of an example neural network system that includes a memory-based neural network including a relational memory core.

FIG. 1 shows an architecture of an example neural network system 100 that includes a memory-based neural network 102 including a relational memory core (RMC) 105. The neural network system 100 is an example of a system implemented as computer programs on one or more computers in one or more locations, in which the systems, components, and techniques described below can be implemented.

Generally, the neural network system 100 is a machine learning system that is configured to receive a sequence of inputs and generate a sequence of outputs from the inputs in order to perform a relational reasoning task. A relational reasoning task requires an understanding of the relationship among inputs that were received at previous time steps and the new input received at the current time step and using this understanding to accomplish a higher order goal. As a simplified example, the neural network system 100 can receive inputs that are a sequence of randomly sampled vectors. The output of the system at each time step can be an answer to the question: "What is the nth farthest vector in Euclidean distance from vector m?", where the vector values n and m are randomly sampled per sequence.

As another example, the neural network system 100 may be a neural machine translation system. In this example, the input sequence is a sequence of words in an original language, e.g., a sentence or phrase, and the output sequence may be a translation of the input sequence into a target language, i.e., a sequence of words in the target language that represents the sequence of words in the original language. Relational reasoning is important for machine translation, especially when a whole sentence or text needs to be translated. In these cases, in order to produce an accurate translation, the system 100 needs to understand the meaning of a whole sentence instead of single words, and therefore needs to understand how the words in the input sequence are connected/related to each other.

As another example, the neural network system 100 may be a natural language processing or generation system. For example, if the input sequence is a sequence of words in an original language, e.g., a sentence or phrase, the output sequence may be a summary of the input sequence in the original language, i.e., a sequence that has fewer words than the input sequence but that retains the essential meaning of the input sequence. As another example, if the input sequence is a sequence of words that form a question, the output sequence can be a sequence of words that form an answer to the question. In these examples, relational reasoning is required as the system 100 needs to understand the meaning of each word in the input sequence and compare the words to each other to determine keywords and the essential meaning of the input sequence. In another example, the input comprises a sequence of words and the output comprises time series data for generating speech corresponding to the words.

As another example, the neural network system 100 may be part of a computer-assisted medical diagnosis system. For example, the input sequence can be a sequence of data from an electronic medical record of a patient and the output sequence can be a sequence of predicted treatments. To generate a predicted treatment, the system 100 needs to analyze multiple pieces of data in the input sequence to find a correlation between these pieces of data. Based on the correlation, the system 100 can determine, for example, symptoms of a disease and/or progression of an existing disease in order to predict an appropriate treatment for the patient. In another example the input may comprise a sequence of sensor data from a medical sensor sensing a condition or one or more parameters of a patient and the output may comprise time series data representing a condition or degree of concern or alert for the patient.

As yet another example, the neural network system 100 may be, or be part of, a reinforcement learning system for controlling an agent interacting with an environment that receives as input data characterizing the environment (observations) and in response to each observation, generates an output that defines an action to be performed by the agent in order to complete a specified task. The specified task can be, for example, navigating an environment to collect pre-specified items while avoiding moving obstacles. Such tasks require relational reasoning capability, as the neural network must predict the dynamics of the moving obstacles in memory based on previous observations, and plan the agent's navigation accordingly and also based on remembered information about which items have already been picked up. Some further examples of such a reinforcement learning system are given later.

As another example, the neural network system 100 may be part of an image processing or generation system. For example, the input sequence can be an image, i.e., a sequence of color values from the image, and the output can be a sequence of text that describes the image. As another example, the input sequence can be a sequence of text describing a context and the output sequence can be an image that describes the context. These examples also require relational reasoning among components (e.g., color values from the image) in the input sequence in order to produce an accurate output (e.g., text that describes the image). In another example the neural network system 100 may be used to implement a recurrent neural network for image generation such as DRAW (arXiv: 1502.04623), where the memory may be used for the read and write operations instead of the described selective attention mechanism. In this case the input and output sequences may define images during training, and afterwards the output sequence may define a generated image optionally dependent upon a conditioning variable.

In order to perform the relational reasoning task, the neural network system 100 includes a memory 108 that is configured to store a respective memory vector at each of a plurality of memory locations of the memory 108. The memory vectors may include information about inputs and outputs of previous time steps and optionally, information about intermediate representations of the inputs that are obtained during the processing of the previous inputs. The memory 108 can be denoted as a memory matrix M that has row-wise memory vectors $m_i$. If a current time step is the first time step of a plurality of time steps, the memory matrix M can be randomly initialized or initialized with all of the row-wise memory vectors set to zero. The memory 108 can be implemented as one or more physical storage devices in one or more physical locations or as one or more logical storage devices To allow for interactions between memory vectors, the memory-based neural network 102 includes the RMC 105 that is configured to apply an attention mechanism over the memory vectors and an input received at each time step of a plurality of time steps. An attention mechanism generally maps a query and a set of key-value pairs to an output, where the query, keys, and values are all vectors. The output is computed as a weighted sum of the values, where the weight assigned to each value is computed by a compatibility function of the query with the corresponding key.

At each time step, the RMC 105 is configured to receive an input 110 and the memory 108. The input 110 may be a network input of the memory-based neural network 102 for the current time step, or an intermediate input derived from a network input of the memory-based neural network for the current time step. For example, the memory-based neural network 102 can directly provide the network input for the time step to the RMC 105 or can first process the network input through one or more neural network layers and provide the output of this processing as the input to the RMC 105 at the time step.

The RMC 105 determines an update to the memory 108 by applying a multi-head dot product attention (also known as self-attention) over the memory vectors in the memory 108 and the received input 110. By using multi-head dot product attention, each memory vector $m_i$ in the memory matrix M can attend over all of the other memory vectors and update its content based on the attended information. Further, because the RMC 105 receives both the memory 108 and the input 110, the neural network system 100 described herein can better understand the relationship between the current input at a current time step and inputs/outputs of previous time steps that are stored in the memory 108.

To apply a multi-head dot product attention, the RMC 105 includes multiple self-attention layers 104 (i.e., multiple heads). For example, the RMC 105 includes h self-attention layers where h≥2. The RMC maintains h sets of parameters for the h self-attention layers. Each of the h self-attention layers corresponds to a respective parameter set of the h parameter sets, a respective sub-memory of the memory matrix M, and a respective sub-memory of an appended memory matrix [M; x] that is created by appending the input 110 (denoted as x) to the memory. For example, the input 110 is an input vector x, and [M; x] is a row-wise concatenation of the memory matrix M and the input x (i.e., input 110). A sub-memory of the memory matrix M is a subset of the memory vectors in the memory M and there is generally no overlap between the sub-memories of M. Similarly, a sub-memory of the appended memory matrix [M; x] is a subset of the memory vectors in the memory M with the input x appended to the subset. Each set of the h parameter sets, which corresponds to a self-attention layer of the h self-attention layers, includes a respective query weight matrix $W^q$, a respective key weight matrix $W^k$, and a respective value weight matrix $W^v$.

At each time step, each self-attention layer is configured to determine a proposed update to the respective sub-memory by applying an attention mechanism A( ) over memory vectors in the respective sub-memory and the respective sub-appended memory using the respective parameter set. The self-attention layers can operate in parallel.

For example, given that M is an N×F dimensional memory matrix and the RMC 105 includes two self-attention layers (i.e. two heads), at each time step, the first self-attention layer computes a first proposed update $\widetilde{M^1} = A_\theta(M)$ and the second self-attention layer computes a second proposed update $\widetilde{M^2} = A_\phi(M)$. $\widetilde{M^1}$ and $\widetilde{M^2}$ are N×F/2 dimensional memory matrices, and $\theta$ and $\phi$ denote unique parameters for linear projections to produce the queries (Q=MW$^q$), keys (K=MW$^k$) and values (V=MW$^v$) for each memory vectors (i.e., row $m_i$) in the corresponding sub-memories of the memory matrix M.

The process for determining a proposed update to the respective sub-memory by applying an attention mechanism A( ) over memory vectors in the respective sub-memory and the respective sub-appended memory using the respective parameter set are described in more detail below with reference to FIG. 2.

After the proposed updates are generated by the self-attention layers, the RMC 105 is configured to, at each time step, combine the proposed updates generated by the h self-attention layers to generate the update for the memory 108. In the above example, the RMC 105 combines $\widetilde{M^1}$ and $\widetilde{M^2}$ to generate the first updated memory $\tilde{M} = [\widetilde{M^1} : \widetilde{M^2}]$, where [:] denotes column-wise concatenation. The first updated memory $\tilde{M}$ is a new memory where information is blended across memory vectors based on the weights in their attention weight matrices. A residual is computed based on the first updated memory $\tilde{M}$ and the memory M using a residual connection 118.

The RMC 105 further includes a feedforward neural network 106 and one or more memory gating layers, e.g. the gating layer 116. The feedforward neural network 106 is configured to receive as input the residual computed based on the first updated memory $\tilde{M}$ and the memory M and to process the residual to generate a second updated memory M'. For example, the feedforward neural network 106 includes a multilayer perceptron (MLP) and the MLP is applied row-wise to $\tilde{M}$ to generate M'. A second residual connection 120 is applied on the second updated memory M' and the input of the feedforward neural network 106 (i.e., the residual computed based on $\tilde{M}$ and M) to generate a second residual. The second residual and the memory M are fed as input to the gating layer 116, and are then gated by the gating layer 116 and outputted as an output 112 and/or a next memory 114. In some cases, the output 112 can be provided to the memory-based neural network 102 as a network input of the network 102 for the current time step. In some other cases, the memory-based neural network 102 can process the output 112 through one or more neural network layers to generate a network output for the current time step.

The next memory 114 can be fed as input to the RMC 105 at the next step or to another network component of the memory-based neural network 102.

In particular, the gating layer 116 is configured to process the second residual and the memory M to generate, for each memory vector of the memory M, a respective set of gating parameters including a forget gate f, input gate i, and output gate o, in which each gate has a respective weights and bias, by using a linear projection. For each memory vector, the respective input gate i determines how much the memory vector incorporates information from the current input, the respective forget gate f determines how much the memory vector forgets its previous values from the last time step, and the output gate o determines how much the memory vector influences the output of the RMC 105 at the current time step. The gating layer 116 uses the sets of gating parameters and their weights and bias to generate updated memory vectors in the output 112 and/or the next memory 114. The gating layer 116 may include a Long Short-Term Memory (LSTM) neural network layer that processes the second residual and the memory M in accordance with a current internal state of the LSTM layer to update the current internal state and to generate the output 112 at each time step. The gating layers 116 may optionally apply layer normalization on the output of the LSTM layer to generate the output 112 at each time step. Layer normalization is described in detail in J. Ba, J. Kiros, and G. Hinton. Layer normalization. arXiv: 1607.06450, 2016.

In some implementations, the output 112 is an output for the relational reasoning task that the neural network system 100 is configured to perform. In some other implementations, the output 112 is an intermediate output that characterizes a correlation or a relationship between the input 110 and information encoded in the memory 108 and that is fed to another network component of the memory-based neural network 102 for further processing.

Because all of the operations performed by the RMC 105 are differentiable, the memory-based neural network 102 can be trained using a conventional neural network training technique that is appropriate for the task that the memory-based neural network 102 is performing, e.g., an appropriate supervised learning or reinforcement learning training technique. During the training, gradients can be backpropagated to adjust the values of the parameters of the various components of the RMC 105, e.g., of the self-attention layers, the feedforward neural network layers, and the gating layers.

Figure 2:
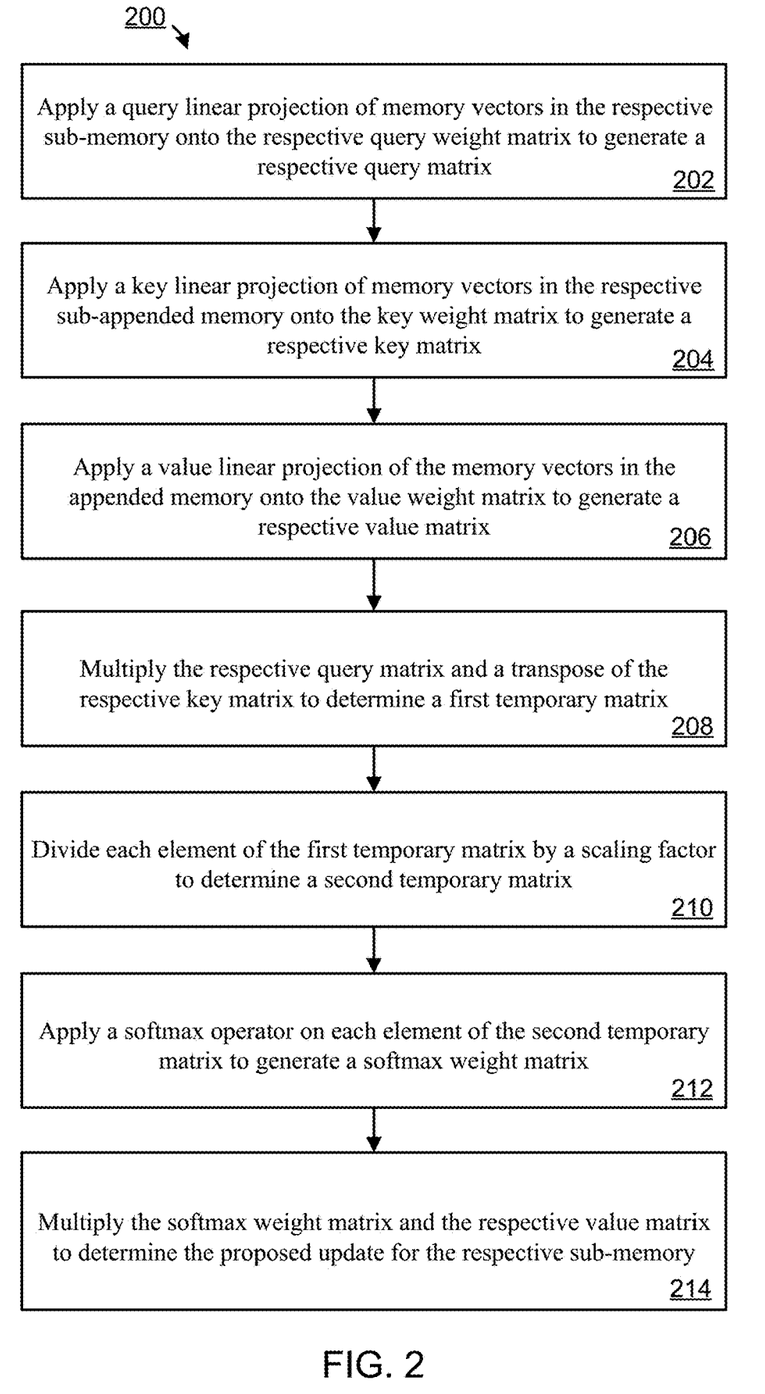
FIG. 2 is a flow diagram of an example process for determining a proposed update to a respective sub-memory of a memory by applying an attention mechanism over memory vectors in the respective sub-memory and a respective sub-appended memory using the respective parameter set.

FIG. 2 is a flow diagram of an example process 200 for each self-attention layer to determine a proposed update to a respective sub-memory of a memory by applying an attention mechanism over memory vectors in the respective sub-memory and a respective sub-appended memory using the respective parameter set. The process 200 is performed by each self-attention layer at each time step.

While the following equations show that an attention mechanism is applied on memory matrix M and [M; x] for the sake of simplicity, it should be understood that each self-attention layer only applies the attention over memory vectors that are within their respective sub-memory and sub-appended memory in order to generate a respective proposed update $\widetilde{M^t}$. The proposed updates generated by the self-attention layers are then column-wise concatenated by a relational memory core to generate the first updated memory $\tilde{M}$.

Each self-attention layer applies a query linear projection of memory vectors $m_i$ in the respective sub-memory onto the respective query weight matrix $W^q$ to generate a respective query matrix: $MW^q$ (step 202).

Each self-attention layer applies a key linear projection of memory vectors in the respective sub-appended memory onto the key weight matrix $W^k$ to generate a respective key matrix: $[M; x] W^k$ (step 204).

Each self-attention layer applies a value linear projection of the memory vectors in the respective sub-appended memory onto the value weight matrix to generate a respective value matrix: $[M; x]W^v$ (step 206).

Each self-attention layer multiplies the respective query matrix and a transpose of the respective key matrix to determine a first temporary matrix: $MW^q([M; x]W^k)^T$ (step 208).

Each self-attention layer divides each element of the first temporary matrix by a scaling factor to determine a second temporary matrix (step 210). The scaling factor is a square root of the dimension $d^k$ of key vectors in the respective key matrix.

The second temporary matrix is computed using the following equation:

$$\frac{MW^q([M;x]W^k)^T}{\sqrt{d^k}}$$

Each self-attention layer applies a softmax operator on each element of the second temporary matrix to generate a softmax weight matrix:

$$\text{softmax}\left(\frac{MW^q([M;x]W^k)^T}{\sqrt{d^k}}\right)$$

(step 212).

Each self-attention layer multiplies the softmax weight matrix and the respective value matrix to determine the proposed update $\widetilde{M^t}$ for the respective sub-memory (step 214):

$$\widetilde{M^t} = \text{softmax}\left(\frac{MW^q([M;x]W^k)^T}{\sqrt{d^k}}\right)[M;x]W^v.$$

The proposed updates $\widetilde{M^t}$ generated by the self-attention layers are then column-wise concatenated by a relational memory core (e.g., the RMC 105 of FIG. 1) to generate the first updated memory $\tilde{M}$.

Figure 3A:
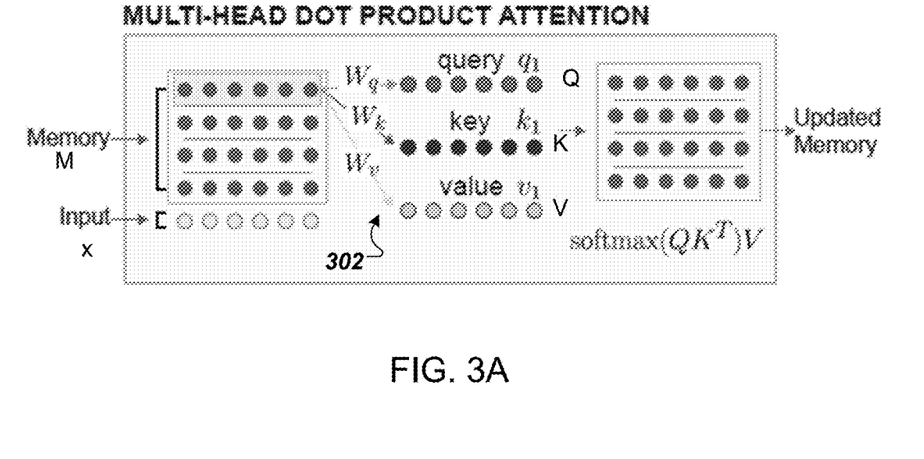
FIGS. 3A and 3B illustrate an example process for each self-attention layer to determine a proposed update $\widetilde{M}^t$ to a respective sub-memory of a memory M.
Figure 3B:
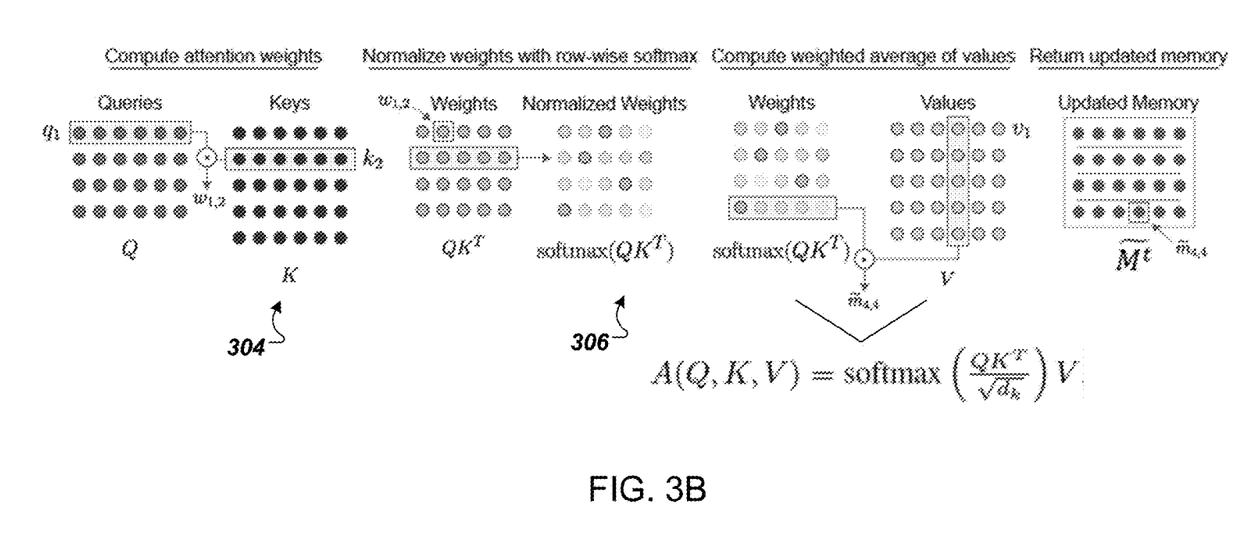

FIGS. 3A and 3B illustrate an example process for each self-attention layer to determine a proposed update $\widetilde{M^t}$ to a respective sub-memory of a memory M.

As shown in FIG. 3A, a linear projection is used to construct queries (Q=MW$^q$), keys (K=[M; x]W$^k$), and values (V=[M; x]W$^v$) for each memory vector in the sub-memory of memory M (302). Next, as shown in FIG. 3B, the queries Q is used to perform a scale dot-product attention over the keys, K (304). The returned scalars QK$^T$ are put through a softmax-function to generate a set of weights (306), which are then used to return a weighted average of values from V as:

$$A(Q, K, V) = \text{softmax}\left(\frac{QK^T}{\sqrt{d_k}}\right)V,$$

where $d^k$ is the dimensionality of the key vectors used as a scaling factor. Equivalently:

$$\widetilde{M^t} = \text{softmax}\left(\frac{MW^q([M;x]W^k)^T}{\sqrt{d^k}}\right)[M;x]W^v.$$

Figure 4:
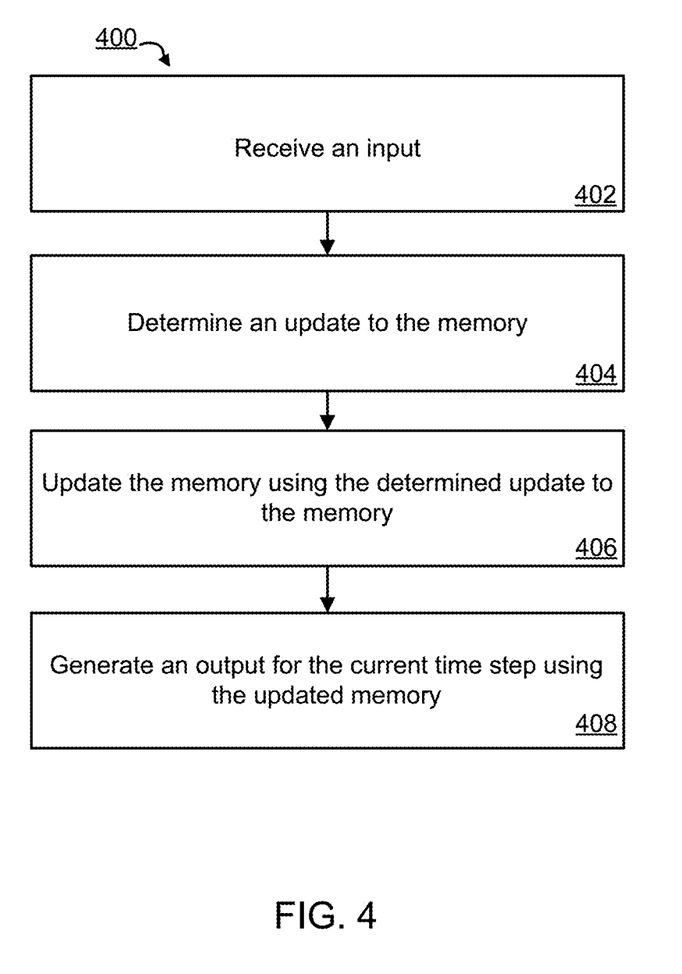
FIG. 4 is a flow diagram of an example process for processing an input to generate an output for a current time step.

FIG. 4 is a flow diagram of an example process for processing an input to generate an output for a current time step using a relational memory core. For convenience, the process 400 will be described as being performed by a system of one or more computers located in one or more locations. For example, a neural network system, e.g., the neural network system 100 of FIG. 1, appropriately programmed in accordance with this specification, can perform the process 400.

The system receives an input (step 402). The input may be a network input of a memory-based neural network (that include the relational memory core) of the system for the current time step, or an intermediate input derived from a network input of the memory-based neural network for the current time step. The system includes a memory M configured to store a respective memory vector at each of a plurality of memory locations in the memory.

The system determines an update to the memory M using the relational memory core (step 404). In particular, the system applies, using the relational memory core, an attention mechanism over the memory vectors in the memory M and the receive input to determine an update to the memory M. The attention mechanism is a multi-head dot product attention (or self-attention) which is described in detail above with reference to FIG. 1 and FIG. 2.

The system updates the memory using the determined update to the memory to generate an updated memory M (step 406).

The system generates an output for the current time step using the updated memory (step 408).

In particular, the system applies a residual connection on the first updated memory M and the memory M to generate a first residual. The system processes the first residual using a feedforward neural network to generate a second updated memory M' (step 408). For example, the feedforward neural network 106 includes a multilayer perceptron (MLP) and the MLP is applied row-wise to the first residual to generate the second updated memory M'.

The system applies a second residual connection on the second updated memory M' and the input of the feedforward neural network (i.e., the residual computed based on M and M) to generate a second residual.

The system applies a gating operation on the second residual and the memory M using a gating neural network layer to generate a gating output and/or a next memory. In some implementations, the gating output of the gating layer is an output of the system for the time steps. In some other implementations, the system further processes the gating output through one or more neural network layers to generate an output for the current time step. The next memory can be fed as input to the relational memory core at the next time step or to another network component of the system.

As previously described the neural network system may be incorporated into a reinforcement learning system controlling an agent in an environment. Such a reinforcement learning system may be of any type. For example it may be a policy-based system (such as Advantage Actor Critic (A3C), Mnih et al. 2016), which directly parameterizes a policy and optionally a value function, or a Q-learning system in which the output approximates an action-value function and optionally a value of a state for determining an action, and it may be a distributed reinforcement learning system such as IMPALA (Importance-Weighted Actor-Learner), Espholt et al., arXiv:1802.01561.

The environment may be a real-world environment and the agent a mechanical/electromechanical agent such as a robot or other static or moving machine interacting with the environment to accomplish a task, e.g. to locate an object of in the environment or to move an object to a specified location in the environment or to navigate to a specified destination in the environment; or the agent may be an autonomous or semi-autonomous land or air or sea vehicle navigating through the environment. The input data (observations) may then include, e.g., one or more of: still or moving images e.g. from a camera or LIDAR, and position, linear or angular velocity, force, torque or acceleration, and global or relative pose of one or more parts of an object and/or the agent. The observations may be defined in 1, 2 or 3 dimensions, and may be absolute and/or relative, and egocentric or otherwise. The output defining actions may be control inputs to control the robot, e.g., torques for the joints of the robot or higher-level control commands; or to control the autonomous or semi-autonomous land or air or sea vehicle, e.g., torques to the control surface or other control elements of the vehicle or higher-level control commands; or e.g. actions to control steering, acceleration or braking. In another example, the environment may be a simulated environment corresponding to the real-world environment, and the agent a simulated agent, for training the reinforcement learning system to control the agent e.g. before use in the real-world.

In the case of an electronic agent the observations may include data from one or more sensors monitoring part of a plant or service facility such as current, voltage, power, temperature and other sensors and/or electronic signals representing the functioning of electronic and/or mechanical items of equipment. In some applications the agent may control actions in a real-world environment including items of equipment, for example in a facility such as: a data center, server farm, or grid mains power or water distribution system, or in a manufacturing plant or service facility. The observations may then relate to operation of the plant or facility. For example additionally or alternatively to those described previously they may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. For example the agent may control electrical or other power consumption, or water use, in the facility and/or a temperature of the facility and/or items within the facility. The actions may include actions controlling or imposing operating conditions on items of equipment of the plant/facility, and/or actions that result in changes to settings in the operation of the plant/facility e.g. to adjust or turn on/off components of the plant/facility. In other applications the agent manages distribution of tasks across computing resources e.g. on a mobile device and/or in a data center. In these implementations, the actions may include assigning tasks to particular computing resources.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TENSORFLOW® framework, a MICROSOFT® Cognitive Toolkit framework, an APACHE® Singa framework, or an APACHE® MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for updating a memory using a memory-based neural network comprising a relational memory core (RMC), the method comprising:
   at each time step of a plurality of time steps:
      receiving an input for the time step;
      determining, using the RMVC and the received input, an update to a memory that is configured to store a respective memory vector at each of a plurality of memory locations in the memory, wherein determining the update comprises:
         applying, using one or more attention layers of the RMC, an attention mechanism over (i) the memory vectors in the memory and (ii) memory vectors in an appended memory that is generated by appending the received input to the memory, wherein applying the attention mechanism over the memory vectors in the memory and the memory vectors in the appended memory comprises:
            generating, from a subset of the memory vectors in the memory, a query matrix;
            generating, from a subset of the memory vectors in the appended memory, a key matrix;
            generating, from the subset of the memory vectors in the appended memory, a value matrix;
            generating, from (i) the query matrix generated from the subset of the memory vectors in the memory and (ii) the key matrix generated from the subset of the memory vectors in the appended memory, a weight matrix; and
            determining a first update to the memory based on the weight matrix and the value matrix generated from the subset of the memory vectors in the appended memory;
      updating, using the RMC, the memory using the determined first update to the memory; and
      generating an output for the time step using the updated memory.

2. The computer-implemented method of claim 1, wherein the input received at each step of the plurality of time steps is one of (i) a network input of the memory-based neural network for the time step or (ii) an intermediate input derived from a network input of the memory-based neural network for the time step.

3. The computer-implemented method of claim 1, wherein at each time step, applying, using the one or more attention layers of the RMC, the attention mechanism over the memory vectors in the memory and the memory vectors in the appended memory comprises:
   determining the first update to the memory by using one of a plurality of self-attention layers and its respective parameter set; and
   determining proposed updates to the memory by using other self-attention layers of the plurality of self-attention layers, wherein each of the other self-attention layers is configured to determine a respective proposed update to the memory by applying an attention mechanism over a respective subset of memory vectors in the memory and a respective subset of memory vectors in the appended memory; and
wherein the method further comprises: at each time step, combining the first update with the proposed updates to generate the update for the memory.

4. The computer-implemented method of claim 3, wherein combining the first update with the proposed updates comprises column-wise concatenating the first update and the proposed updates to generate the update for the memory.

5. The computer-implemented method of claim 3, wherein at each time step, applying the attention mechanism over the memory vectors in the memory and the memory vectors in the appended memory comprises:
   generating, by the one of the plurality of self-attention layers, from the subset of the memory vectors in the memory, the query matrix, by:
      applying a query linear projection of the subset of the memory vectors in the memory onto a query weight matrix to generate the query matrix;
   generating, by the one of the plurality of self-attention layers, from the subset of the memory vectors in the appended memory, the key matrix by:
      applying a key linear projection of the subset of the memory vectors in the appended memory onto a key weight matrix to generate the key matrix;
   generating, by the one of the plurality of self-attention layers, from the subset of the memory vectors in the appended memory, the value matrix by:
      applying a value linear projection of the subset of the memory vectors in the appended memory onto a value weight matrix to generate the value matrix;
   generating, from (i) the query matrix generated from the subset of the memory vectors in the memory and (ii) the key matrix generated from the subset of the memory vectors in the appended memory, a weight matrix by:
      multiplying the query matrix and a transpose of the key matrix to determine a first temporary matrix;
      dividing each element of the first temporary matrix by a scaling factor to determine a second temporary matrix;
      applying a softmax operator on each element of the second temporary matrix to generate the weight matrix; and
   determining the first update to the memory based on the weight matrix and the value matrix generated from the subset of the memory vectors in the appended memory by:
      multiplying the weight matrix and the value matrix to determine the first update to the memory.

6. The computer-implemented method of claim 5, wherein the scaling factor is a square root of a dimension of key vectors in the key matrix.

7. The computer-implemented method of claim 1, wherein at each time step, generating the output for the time step using the updated memory comprises:
   processing the updated memory to generate an intermediate output; and
   gating the intermediate output to generate the output.

8. The computer-implemented method of claim 1, wherein the input is an input vector, and wherein appending the input to the memory comprises performing a row-wise concatenation of the memory and the input vector.

9. The computer-implemented method of claim 1, wherein the input is an input matrix.

10. A system comprising one or more computers and one or more non-transitory computer storage media storing instructions that, when executed by the one or more computers, cause the one or more computers to perform operations for updating a memory using a memory-based neural network comprising a relational memory core (RMC), the operations comprising:
at each time step of a plurality of time steps:
receiving an input for the time step;
determining, using the received input, an update to a memory that is configured to store a respective memory vector at each of a plurality of memory locations in the memory, wherein determining the update comprises:
applying, using one or more attention layers of the RMC, an attention mechanism over (i) the memory vectors in the memory and (ii) memory vectors in an appended memory that is generated by appending the received input to the memory, wherein applying the attention mechanism over the memory vectors in the memory and the memory vectors in the appended memory comprises:
generating, from a subset of the memory vectors in the memory, a query matrix;
generating, from a subset of the memory vectors in the appended memory, a key matrix;
generating, from the subset of the memory vectors in the appended memory, a value matrix;
generating, from (i) the query matrix generated from the subset of the memory vectors in the memory and (ii) the key matrix generated from the subset of the memory vectors in the appended memory, a weight matrix; and
determining a first update to the memory based on the weight matrix and the value matrix generated from the subset of the memory vectors in the appended memory;
updating, using the RMC, the memory using the determined first update to the memory; and
generating an output for the time step using the updated memory.

11. The system of claim 10, wherein the input is one of (i) a network input of the memory-based neural network or (ii) an intermediate input derived from a network input of the memory-based neural network.

12. The system of claim 10, wherein the operations for applying the attention mechanism over the memory vectors in the memory and the memory vectors in the appended memory comprises:
determining the first update to the memory by using one of a plurality of self-attention layers and its respective parameter set; and
determining proposed updates to the memory by using other self-attention layers of the plurality of self-attention layers, wherein each of the other self-attention layers is configured to determine a respective proposed update to the memory by applying an attention mechanism over the subset of the memory vectors in the memory and the subset of the memory vectors in the appended memory; and
wherein the operations further comprise: combining the first update with the proposed updates to generate the update for the memory.

13. The system of claim 12, wherein combining the first update with the proposed updates comprises column-wise concatenating the first update and the proposed updates to generate the update for the memory.

14. The system of claim 12, wherein the operations for applying the attention mechanism over the memory vectors in the memory and the memory vectors in the appended memory comprises:
generating, by the one of the plurality of self-attention layers, from the subset of the memory vectors in the memory, the query matrix, by:
applying a query linear projection of the subset of the memory vectors in the memory onto a query weight matrix to generate the query matrix;
generating, by the one of the plurality of self-attention layers, from the subset of the memory vectors in the appended memory, the key matrix by:
applying a key linear projection of the subset of the memory vectors in the appended memory onto a key weight matrix to generate the key matrix;
generating, by the one of the plurality of self-attention layers, from the subset of the memory vectors in the appended memory, the value matrix by:
applying a value linear projection of the subset of the memory vectors in the appended memory onto a value weight matrix to generate the value matrix;
generating, from (i) the query matrix generated from the subset of the memory vectors in the memory and (ii) the key matrix generated from the subset of the memory vectors in the appended memory, a weight matrix by:
multiplying the query matrix and a transpose of the key matrix to determine a first temporary matrix;
dividing each element of the first temporary matrix by a scaling factor to determine a second temporary matrix;
applying a softmax operator on each element of the second temporary matrix to generate the weight matrix; and
determining the first update to the memory based on the weight matrix and the value matrix generated from the subset of the memory vectors in the appended memory by:
multiplying the weight matrix and the value matrix to determine the first update to the memory.

15. The system of claim 14, wherein the scaling factor is a square root of a dimension of key vectors in the key matrix.

16. The system of claim 10, wherein the operations for generating the output using the updated memory comprises:
processing the updated memory to generate an intermediate output; and
gating the intermediate output to generate the output.

17. The system of claim 10, wherein the input is an input vector, and wherein the operations for appending the input to the memory comprises performing a row-wise concatenation of the memory and the input vector.

18. The system of claim 10, wherein the input is an input matrix.

19. One or more non-transitory computer storage media storing instructions that, when executed by one or more computers, cause the one or more computers to perform operations for updating a memory using a memory-based neural network comprising a relational memory core (RMC), the operations comprising:
at each time step of a plurality of time steps:
receiving an input for the time step;
determining, using the RMC and the received input, an update to a memory that is configured to store a respective memory vector at each of a plurality of memory locations in the memory, wherein determining the update comprises:

applying, using one or more attention layers of the RMC, an attention mechanism over (i) the memory vectors in the memory and (ii) memory vectors in an appended memory that is generated by appending the received input to the memory, wherein applying the attention mechanism over the memory vectors in the memory and the memory vectors in the appended memory comprises:

generating, from a subset of the memory vectors in the memory, a query matrix;

generating, from a subset of the memory vectors in the appended memory, a key matrix;

generating, from the subset of the memory vectors in the appended memory, a value matrix;

generating, from (i) the query matrix generated from the subset of the memory vectors in the memory and (ii) the key matrix generated from the subset of the memory vectors in the appended memory, a weight matrix; and determining a first update to the memory based on the weight matrix and the value matrix generated from the subset of the memory vectors in the appended memory;

updating, using the RMC, the memory using the determined first update to the memory; and generating an output for the time step using the updated memory.

20. The one or more non-transitory computer storage media of claim 19, wherein the operations for applying the attention mechanism over the memory vectors in the memory and the memory vectors in the appended memory comprises:

determining the first update to the memory by using one of a plurality of self-attention layers and its respective parameter set; and determining proposed updates to the memory by using other self-attention layers of the plurality of self-attention layers, wherein each of the other self-attention layers is configured to determine a respective proposed update to the memory by applying an attention mechanism over the subset of memory vectors in the memory and the subset of memory vectors in the appended memory; and wherein the operations further comprise: combining the first update with the proposed updates to generate the update for the memory.

\* \* \* \* \*